United States Patent Office 2,829,490
Patented Apr. 8, 1958

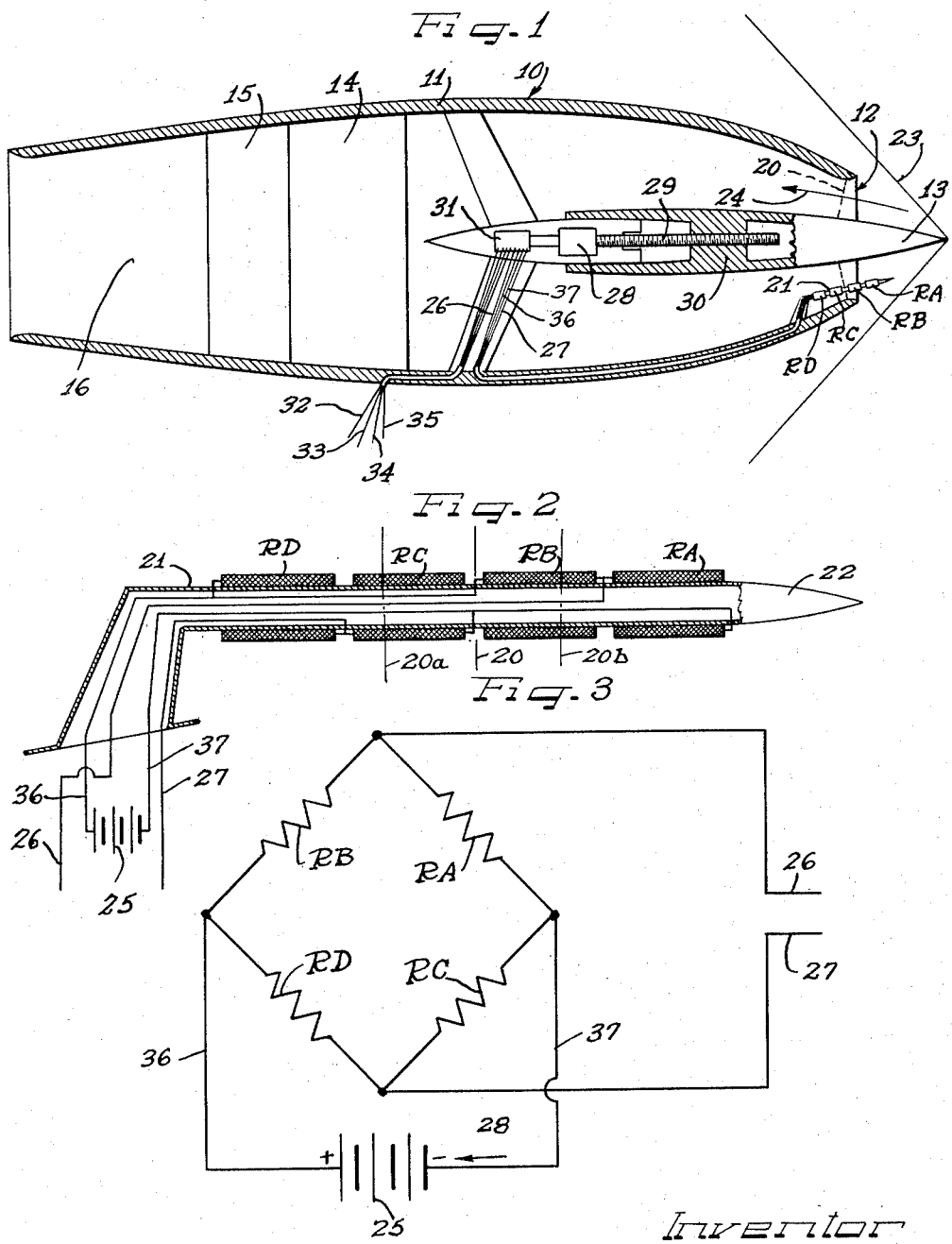

2,829,490

AUTOMATIC CONTROL MEANS FOR VARYING THE GEOMETRY OF THE AIR INLET OF A JET ENGINE

Arthur O. Kresse, Cleveland, Ohio, assignor to Thompson Products, Inc., Cleveland, Ohio, a corporation of Ohio Application August 16, 1954, Serial No. 450,103

3 Claims. (Cl. 60—35.6)

The present invention relates to the control of the air inlet for air-breathing jet engines or the like and, more particularly, is concerned with the provision of means for automatically varying the inlet geometry of the jet engine in accordance with flight conditions.

With development of modern jet engines capable of operation at speeds above the speed of sound the problem of controlling the flow of air into the jet engine during such high speed flight has assumed substantial importance. As those skilled in the art are aware, at relative velocities above the speed of sound or above Mach 1, compression waves, ordinarily termed shock waves are formed. The position of the shock waves thus formed relative to the various component parts of the jet engine air inlet is of great importance and affects to a large degree the efficiency of air passage.

As is generally known, the static pressure on the downstream side of a normal shock wave, or one which lies at right angles to the path of air flow, is substantially greater than the static pressure upstream of the shock wave. In view of this static pressure rise, which is ordinarily quite pronounced, sensing means have been developed for accurately determining the position, within certain practical limits, of the normal shock wave. By positioning such instruments in the mouth of the jet engine air intake the exact position of the normal shock wave relative to the mouth may be determined.

Since, as noted above, the efficiency of operation of the air inlet at relative air speeds above Mach 1, depends upon the positioning of the shock wave relative to the specific inlet configuration, it is desired that the optimum position of the normal shock wave relative to the air inlet be determined and that the air inlet geometry be automatically varied with flight conditions to maintain the position of the normal shock wave at that optimum point. The present invention thus provides an automatic control for a jet engine air inlet, which control will automatically vary the position of the normal shock within the inlet. The structure of the present invention takes the form of a generally circular air inlet having a central, longitudinally extending, spike or center member having a gradually tapering shape which is longitudinally movable in and out of the opening to vary the dimensions of the opening. The exact position of the spike relative to the opening is varied to modify the position of the normal shock wave in the opening, in accordance with signals emitted by a longitudinally extending shock positioning gauge projecting generally parallel to the spike, in the jet engine opening.

The sensing device utilized in accordance with the present invention comprises generally an elongated strain gauge tube having four identical strain gauge wire windings positioned at spaced points therealong. The strain gauge windings, which vary in resistance according to the static pressure applied to the peripheral surface of the tube, are connected in a bridge circuit such that an unbalance caused by a shifting of position of the normal shock wave relative to the gauge will cause a correcting influence on a motor controlling the position of the spike. The correcting influence will cause the spike to be moved to shift the position of the normal shock wave back to the design point.

It is therefore an object of the present invention to provide a novel, automatic control system for the air inlet of jet engines or the like.

Still another object of the present invention is to provide a novel sensing apparatus for accurately determining the position of a shock wave.

A further object of the present invention is to provide a simple and yet highly effective control for varying the geometry of the air inlet of a jet engine or the like and which automatically operates to position the normal shock wave formed at operation above Mach 1, velocities, at a predetermined optimum design point.

Yet another object of the present invention is to provide a novel sensing apparatus for determining the position of a static pressure increase and embodying a signal generating means for effecting a shift in the position of the static pressure change along the longitudinal axis of the gauge to a predetermined selected point.

Still another feature of the present invention is to provide a novel automatically controlled center spike air inlet for jet engines or the like.

A feature of the invention is a strain gauge tube having a plurality of strain gauge windings positioned on the peripheral surface thereof and having electrical connections into a bridge circuit controlling the geometry of an engine air inlet.

Still other and further objects and features of the present invention will at once become apparent to those skilled in the art from a consideration of the attached drawing wherein:

Figure 1 is an elevational view in cross-section illustrating diagrammatically the relationship of the parts of the present invention;

Figure 2 is an enlarged elevational view of the sensing gauge utilized with the apparatus of the present invention; and Figure 3 is an electrical schematic diagram illustrating the electrical inner-connection of the pressure differential sensing elements of the invention.

As shown on the drawings:

As may be seen in Figure 1, the present apparatus is used in cooperation with a jet type engine generally indicated at 10 having a streamlined outer housing 11 provided with an annular air scoop or air inlet 12, the configuration of which is modified by reciprocatory movement of the spike 13. Air passing in the inlet 12 is compressed in a conventional compressor section 14, mixed with fuel and the mixture ignited in the burner section 15 and combustion completed in the after burner section 16 in a conventional manner. It will be understood that the construction of the compressor, burner, and after-burner sections of the engine may be conventional and their particular arrangement forms no part of the present invention.

It has been found through experimentation and operation that air inlets of the type indicated at 12, have a maximum operating efficiency when the position of the normal shock wave 20 lies in a particular predetermined axial position relative to the inlet 12. The actual optimum position of the normal shock wave will, of course, vary somewhat with different air inlet designs but it has been found as a general conclusion that the efficiency of the inlet, when operating above the speed of sound, will reach a peak when the normal shock wave is positioned at a single specific design position. While the actual position of the normal shock wave may be computed, knowing all of the pertinent atmospheric conditions, velocity of the air inlet and position of the spike 13, all of these factors, with the possible exception of the spike position, vary over wide ranges during normal engine operation. Therefore, in order that the position of the normal shock wave 20 relative to the inlet 12 may be maintained at the selected peak efficiency position, it is necessary that the position of the spike 13 be controlled to compensate for the effect of the changes in inlet air velocity and atmospheric conditions upon the position of the shock wave.

Adjustment of the position of the spike 13 is preferably automatic and the automatic control thus requires a sensing apparatus for determining accurately the position of the shock wave 20. The present invention provides an extremely simple and yet highly effective sensing apparatus for controlling the position of the spike 13 to cause a positioning of the shock wave 20 at its predetermined optimum design point. The sensing apparatus, shown in the enlarged view of Figure 2, comprises a strain gauge in the form of a tube 21 preferably closed at both ends and having its front end 22 streamlined. About the surface of the tube 21 are four equal strain gauge windings, $R_A$, $R_B$, $R_C$, and $R_D$, with electrical connections as shown in Figure 2, preferably running through the interior of the tube. The position of the windings is such that the normal shock wave 20 is positioned between the adjacent ends of the strain gauge windings $R_B$ and $R_C$. The gauge tube 21 is positioned, as shown in Figure 1 so that both of the coils $R_A$ and $R_B$ lie between the normal shock wave 20 and the bow wave 23 and generally parallel to the path of flow indicated by the arrow 24. With this relationship, the air pressure applied against the coils $R_A$ and $R_B$ will be the same while the pressure applied against the coils $R_C$ and $R_D$ will be substantially greater, being on the high pressure side of the shock wave 20, than the pressure on the coils $R_A$ and $R_B$. The pressure on the coil $R_C$ will, also, be the same as the pressure applied against the coil $R_D$ since they both lie on the same side of the pressure of the normal shock wave 20.

The electrical connection of the coils may be seen from the schematic diagram of Figure 3. There, the resistances are shown connected into a bridge circuit supplied by a direct or alternating current source such as the battery 25. Since the pressure on the windings $R_C$ and $R_D$ is the same, in the situation where the normal shock 20 is positioned as shown in Figures 1 and 2, and likewise the coils $R_A$ and $R_B$ are under a similar pressure, the resistances are such that $R_C$ equals $R_D$ and $R_A$ equals $R_B$. In such a situation, the bridge circuit will be balanced and the electrical potential at the outlet terminals 26 and 27 will be zero. However, if the normal shock wave 20 should shift to the position shown at 20a in Figure 2, the area of increased pressure, downstream of the shock wave would be decreased, and hence the tube 21 will expand within a portion of the coil $R_C$ causing an outward expansion and an increase in resistance in the value of $R_C$. Assuming current flow in the circuit diagram as shown by the arrow 28, an increase in the resistance $R_C$ will cause an increase in the potential at 27, relative to the balanced condition, thereby tending to cause a current flow from the outlet terminal 27 to the terminal 26, assuming that the terminals 26 and 27 were bridged. On the other hand, should the normal shock wave position itself as indicated at 20b in Figure 2, the winding $R_B$ would be placed under an increased pressure since a portion of it would be positioned downstream or on the high pressure side of the normal shock wave 20. This increased pressure would cause a decrease in the average resistance of the element $R_B$. This decrease causes an increase of the potential at the point 26 relative to the value when the bridge is balanced, thus tending to cause a current flow from the point 26 to the terminal point 27, the reverse of the current flow upon an increase in the resistance $R_C$.

The variation thus affected in the potential at the output terminals 26 and 27 may be utilized in any conventional manner to operate a servomotor 28, to rotate the screw 29 acting in cooperation with the nut 30, thereby reciprocating the spike 13. Such conventional control circuits could include a current responsive control, positioned in the control box 31, or alternatively, a high impedance voltage amplifying control likewise housed alternatively in the box 31.

It will be appreciated that the present system has an inherent feed back or follow up action since movement of the spike 13, in response to the signals above described, will automatically cause a corresponding movement of the shock wave 20, movement of which causes an immediate decrease in the unbalance of the bridge circuit. Further, automatic temperature compensation is achieved through the present system since all of the coils $R_A$, $R_B$, $R_C$ and $R_D$ are operating under the same temperature conditions.

From the discussion, it will be apparent that upon a shifting of the position of the normal shock 20, an immediate counteracting movement of the strike 13 will take place to cause the shock wave 20 to return to its designed position. For example, should the shock wave 20 move downstream, into the range of the gauge coil $R_C$ as a result of an increase in air inlet velocity or atmospheric conditions, the motor 28 would immediately be energized to move the spike 13 forward in the air inlet 12. This forward movement of the spike 13 would cause a restriction in the inlet 12 as well as a change in geometry which will tend to move the shock wave 20 forwardly in the air inlet until it positions itself between the strain gauge coils $R_B$ and $R_C$ at which time the control circuit bridge is balanced and the motor 14 becomes de-energized.

Although the above described system is automatic in its operation it will be understood that a manual control circuit may be provided by means of any conventional control applied to the control box 31 through the conductors 32 and 33. Direct current power or any other source of power suitable for providing the necessary current for energization of the bridge circuit and the motor 28, as well as the control 31, may be applied through conductors 34 and 35 relayed from the control 31 to the coils through the conductors 36 and 37.

It will thus be apparent that I have developed a novel, simple and yet highly effective control for the air inlet of modern jet type engines required to operate at or above the speed of sound. The simple control herein disclosed effectively ascertains the exact position of the normal shock wave and applies a corrective influence to return the position of the normal shock wave to a predetermined optimum design position upon any deviation therefrom resulting from changes in air inlet velocity or atmospheric conditions.

It will be further apparent that variations and modifications may be made in the structure above set forth by way of illustration, without departing from the scope of the novel concepts of the present invention and it is therefore my intention that the invention herein disclosed be limited only by the scope of the appended claims.

I claim as my invention:

1. In a jet engine having an air inlet and means for modifying the geometry thereof to adjust the axial position of the normal shock wave set up therein during operation at an air inlet velocity above Mach 1, a sensing device for constantly determining the position of said wave, and means associated with said sensing device for automatically controlling said modifying means to maintain said normal shock in adjusted position, said sensing device comprising a strain gauge tube having strain gauge windings thereon spaced longitudinally along the surface thereof to provide one of said windings on each side of the desired longitudinal position of the normal shock wave, electrical conductors connecting said windings into a bridge circuit as resistances therein and wherein a change in resistance of one of said windings occasioned by a movement of said shock wave longitudinally in one direction causing a change in average pressure on said one winding will electrically unbalance said bridge to operate said modifying means to adjust the axial position of the shock wave in one direction to its desired position and wherein a change in resistance of the other of said windings occasioned by a movement of said shock wave longitudinally in the other direction causing a change in average pressure on said other winding will electrically unbalance said bridge to operate said modifying means to adjust the axial position of the shock wave in the opposite direction to its desired position.

2. In a jet engine having an air inlet and means for modifying the geometry thereof to adjust the axial position of the normal shock wave set up therein during operation at an air inlet velocity above Mach 1, a sensing device for constantly determining the position of said wave, and means associated with said sensing device for automatically controlling said modifying means to maintain said normal shock in adjusted position, said sensing device comprising a strain gauge tube having four substantially identical strain gauge windings spaced longitudinally along the surface thereof to provide end windings and intermediate windings, electrical conductors connecting said windings into a bridge circuit wherein variation in the resistance of one of said intermediate windings in response to pressure thereon will unbalance said bridge to operate said modifying means and wherein a change in resistance of the other of said intermediate windings will unbalance the bridge to operate said modifying means in the opposite direction.

3. In a jet engine having an air inlet and means for modifying the geometry thereof to adjust the axial position of the normal shock wave set up therein during operation at an air inlet, velocity above Mach 1, a sensing device for automatically controlling said modifying means to maintain said normal shock in adjusted position, said sensing device comprising a strain gauge tube positioned longitudinally in the air inlet and having four strain gauge resistance windings spaced therealong the pair of coils on each end being connected in series and in parallel with the pair of coils on the opposite end relative to a source of current supply, and means connecting the points between the two coils of each respective pair of coils with said automatically controlling means.

References Cited in the file of this patent
UNITED STATES PATENTS

| | | |
|---|---|---|
| 2,540,594 | Price | Feb. 6, 1951 |
| 2,566,326 | Guillemin | Sept. 4, 1951 |
| 2,580,407 | Clark | Jan. 1, 1952 |
| 2,629,801 | Warshaw | Feb. 24, 1953 |
| 2,638,738 | Salter | May 19, 1953 |
| 2,641,131 | Waugh | June 9, 1953 |